Dec. 27, 1927.

R. B. JONES

SEMITRAILER

Filed Feb. 18, 1926

Inventor

Rufus B. Jones

By Wood & Wood

Attorneys

Dec. 27, 1927.　　　　　　　　　　　　　　　1,654,503
R. B. JONES
SEMITRAILER
Filed Feb. 18, 1926　　　2 Sheets-Sheet 2

Inventor
Rufus B. Jones
By Wood & Wood
Attorneys

Patented Dec. 27, 1927.

1,654,503

UNITED STATES PATENT OFFICE.

RUFUS B. JONES, OF CINCINNATI, OHIO, ASSIGNOR TO THE TRAILMOBILE COMPANY, OF CINCINNATI, OHIO, A CORPORATION OF OHIO.

SEMITRAILER.

Application filed February 18, 1926. Serial No. 89,207.

My invention relates to improvements in semi-trailers and is particularly directed to the mechanism for supporting the coupling end of the semi-trailer when uncoupled from a drawing vehicle.

This type of trailer has its forward end adapted to be supported on the rear of a tractor for both a draft and load sustaining connection and has its rear end provided with heavy service wheels for running gear. A prop is provided at the forward end of the trailer as a support for the same when the trailer is uncoupled from the drawing vehicle.

The drawing vehicle generally has an inclined surface or skid at its rear terminating forwardly in a horizontal support portion at its upper end so that the action of the drawing vehicle as it backs into the forward end of the trailer is to raise the same slightly from the ground before coupling thereto. This action raises the prop from the ground but not sufficiently to clear unevenness in the road surface. This prop is therefore pivoted to the frame so that it can be swung upwardly and clear road obstacles when the trailer and tractor are operating together.

Locking mechanism is provided on the prop for rigidly securing it in position for sustaining the trailer load and this locking mechanism is provided with a manual release which necessarily presents the hazard of accidental releasing of the locking mechanism when the trailer is in uncoupled position and is supported on the prop.

Therefore an object of this invention is to provide a locking mechanism for rigidly non-releasably securing the prop to the frame of the trailer in load supporting position when the trailer is uncoupled, said lock releasable for permitting swing of the prop only when the forward end of the trailer has been raised from the ground.

Another object of my invention is to provide a prop on a semi-trailer which can be easily raised from the ground when the forward end of the trailer is supported on the drawing vehicle and the prop is not in use, having thereon a locking mechanism for automatically locking the prop to the frame when the trailer rests on the prop.

Other objects and certain advantages will appear in the description of the accompanying drawings forming a part of this invention in which:

Figure 3 is a detail sectional view taken on line 3—3, Figure 2 showing the locking mechanism in position to be released, and showing in dot and dash lines the position when released.

Figure 4 is a diagrammatic view of trailer and drawing vehicle as a unit.

Figure 1:
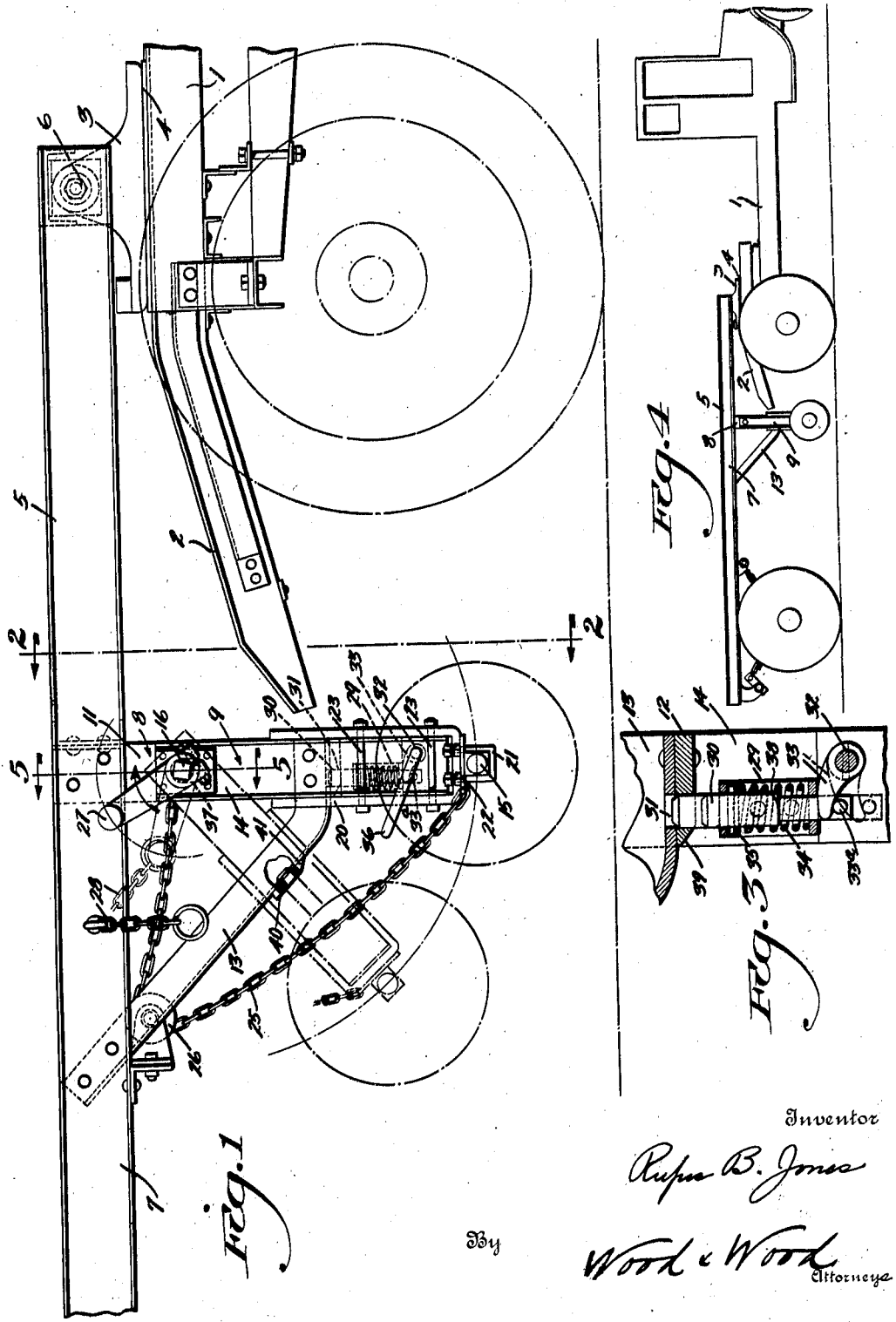
Figure 1 is a side elevation of the forward or coupling end of the trailer in coupled position on the rear of a drawing vehicle.

As shown in the drawings the coupling mechanism at the rear of the drawing vehicle 1 consists of an inclined surface or skid 2 for guiding the upper fifth wheel 3 of the trailer onto the lower fifth wheel 4 on the drawing vehicle in the coupling operation and at the same time raising the front end of the trailer 5 into support position on the drawing vehicle. Means are provided (not shown) for automatically locking the fifth wheels together for a proper draft connection. Inasmuch as the coupling means forms no part of this invention the mechanism used is not disclosed. The upper fifth wheel is pivoted to the frame of the trailer as at 6 in order that it may adjust itself to the angle of the skid 2 when the drawing vehicle carrying the skid backs under it in the coupling operation.

Depending from the frame 7 and sufficiently spaced from the forward end of the trailer sufficiently not to strike the skid, is the trailer prop mechanism, consisting of the depending portion 8 of the frame and the prop 9 pivoted thereto. Both the depending portion 8 of the frame and the prop are approximately U shaped, the depending portion 8 consisting of side members 11 suitably fastened to the frame and a cross member 12, these members 11 and 12 fastened together by the angle iron braces 13 extending rearward and upwardly to the frame 7. The prop consists of channel iron side members 14 and the axle 15 forming the cross member. The depending portion 8 is provided with a pivot shaft 16 approximately at its upper end this shaft being journalled in the side members 11 and extending through a sufficient distance for entering into the upper ends of the channel iron sides 14 of the prop for pivotally supporting the latter. To a certain extent the U shaped prop is disposed about the U shaped depending portion 8 and is spaced therefrom by washers 17 and held upon the pivot shaft 16 by a nut 18 at one end and a collar 19 at the other. The channel irons of the prop are adjustably fastened to the axle 15 by means of U shaped straps 20 disposed about the lower ends of the channels these U shaped straps 20 being bolted at their base to the axle 15 by means of the bolts 21 and a plate 22. The straps are held to the channel iron sides by the bolts 23 extending through the ribs of the channels and the sides of the straps being provided with a series of apertures 24 adapting the sides and base or cross member of the U shaped prop to be adjustable upon each other for lengthening the prop to accommodate various height of trailer and drawing vehicle.

A chain 25 is provided for raising the prop by swinging it on its pivot, one end of the chain being fastened centrally of the base of the prop and passing upwardly and around a pulley 26 secured to the trailer frame at the rear of the prop and forward to the pivot shaft 16 and secured centrally thereto.

Rotation of the pivot shaft winds the chain thereabout and raises the prop to the desired height. The end of the pivot shaft 16 is squared to receive a handle 27 for rotating the same and a chain 28 carrying a ring is secured to the frame at the rear of the handle the ring adapted to be placed over the handle to prevent (as shown in dot and dash lines Fig. 1) the prop from dropping back to its lower position when the handle is released. This windlass mechanism provides for ease of operation in raising the weighty prop.

The locking mechanism consists of brackets 29 secured to the inner side of the channels of the prop directly below the base of the depending portion 8 and latch pins 30 vertically translatable in the brackets 29. These latch pins extend vertically through extending ribs on the brackets their upper end adapted to enter apertures 31 in the cross member or base of the depending portion 8 of the frame.

A cross shaft 32 mounted in the prop is provided, and rotatably secured therewith are releasing members 33 having claw-like extensions for engaging pins 33ª in the lower ends of the latch pins these releasing members being normally held against the lower ribs of the brackets by means of springs 34 on the latch pins. The springs normally hold these latch pins in engagement with the apertures 31 in the frame for locking the prop to the frame.

The springs are inserted about the latch pins between the lower ribs of the brackets and washers 35 secured to the latch pins between the ribs of the brackets. When the shaft 32 is rotated by means of an upturned handle portion 36 on its end the latch pins are pulled downwardly and out of engagement with the apertures 31, by the releasing members 33 and the springs are compressed for returning the latch pins to latching position when the handle portion 36 is released.

Figures 2, 5, 6:
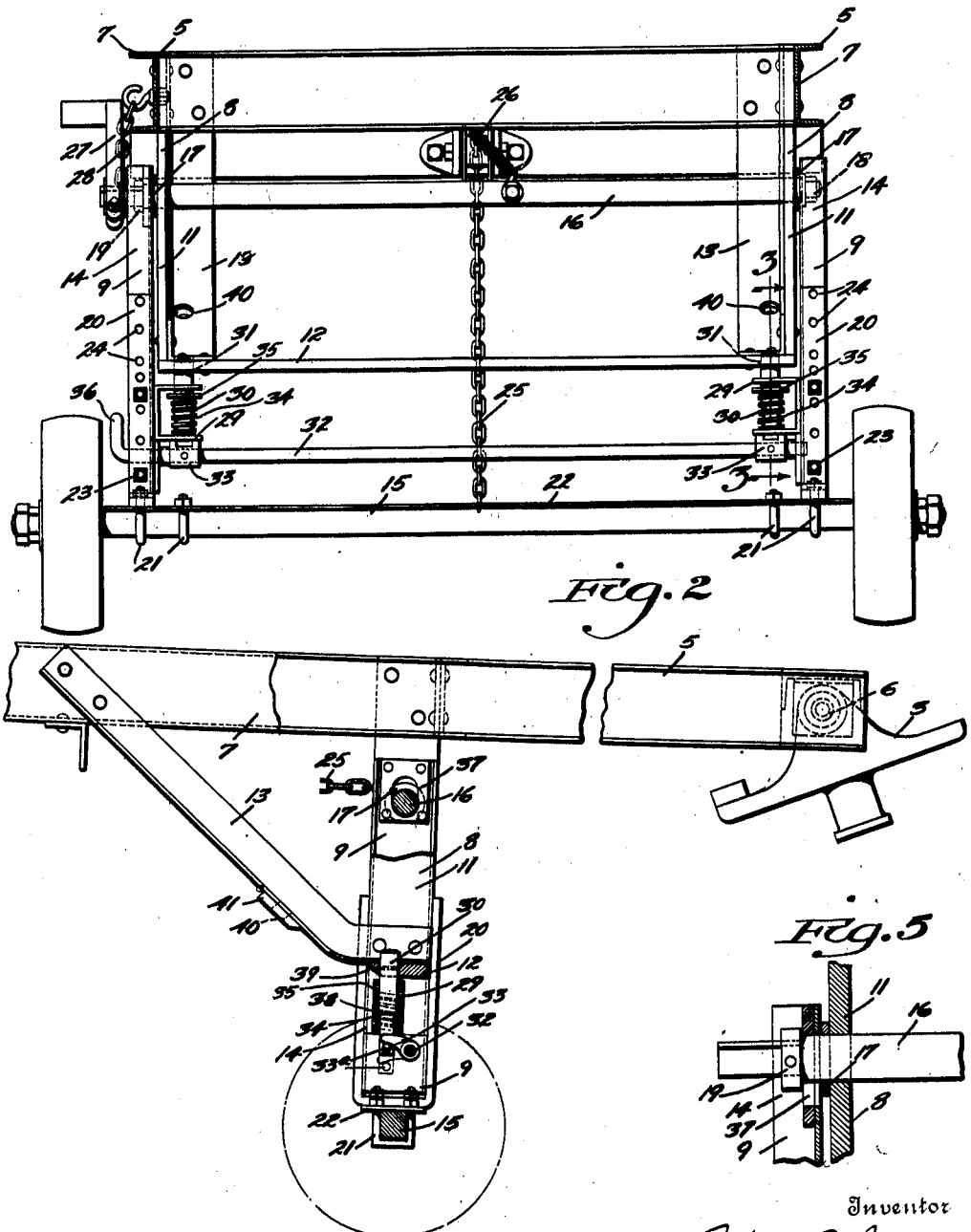
Figure 2 is a sectional view on line 2—2, Fig. 1 showing the prop in front elevation and in locked position.
Figure 5 is a detail sectional view of line 5—5, Fig. 1 showing the prop pivot construction.
Figure 6 is a side elevation of the trailer in uncoupled position and supported by its prop.

In order that the latch pins can never be disengaged from the apertures 31 in the depending frame portion, and the prop unlatched when in supporting or operative position, slots 37 or elongated openings are provided in the channel iron side members of the prop for the pivot shaft to extend through. Thus when the prop is supporting the trailer (as shown in Fig. 6) the pivot shaft 16 is held in the bottom of the elongated openings by the weight of the trailer upon the pivot shaft.

The depending portion of the trailer frame moves downwardly in relation to the prop moving the pivot rod 16 downwardly in the slot as the prop strikes the ground and since the latch pins 30 are mounted upon the prop they are caused to enter still further into the apertures 31 in the base of the depending portion. The latch pins have a limited throw when translated by the releasing members this being accomplished by means of shoulders 38 formed intermediate the ends of the latch pins and adapted to strike the lower ribs of the brackets 29 as the pins are withdrawn from the apertures 31. When the trailer is supported on the rear of a drawing vehicle and the prop moves downward in relation to the leg portion and is supported by the pivot shaft, the shaft being in the upper end of the slot 37, the distance that the latch pins can be translated is sufficient to disengage them from the apertures (as shown in dot-and-dash lines, Fig. 3) for permitting swing of the prop. But when the latch pins 30 are caused to enter further into the apertures 31 as before mentioned, by the vertical movement of the prop on its pivot, they cannot be disengaged from the apertures (as shown in Fig. 6) and it is impossible to unlatch the prop.

In order that the latch pins may snap into the apertures for locking the prop to the frame, the cross-member or base of the leg portion is chamfered as at 39. When the prop is dropped from raised position the chamfered heads of the latch pins strike the chamfered portions of the cross member and the latch pins snap into place in the apertures 31. Apertures 40 are provided in the braces 13 for latching the prop in upper or raised position. As the prop is raised by means of the chain the latch pins 30 strike the chamfered edge of a block 41 secured on the bottom of the braces 13 and having the apertures 40 therethrough, and snap into engagement with the apertures 40. The prop is thus secured in upper position by this means and also by the manner of securing the handle 27 described before. The release is accomplished in the same manner as the pins are released from the apertures 31.

Wheels are shown mounted upon the axle cross member or base but it can readily be seen that by lengthening the channel iron sides of the prop merely a cross member need be used thereon as a support means. It is most advantageous however to have wheels on the prop for moving the trailer around in small spaces without the use of a drawing vehicle.

Having described my invention, I claim:

1. The combination of a tractor and a trailer, said trailer comprising a frame, a prop pivoted to the forward or coupling end thereof and having elongated pivot apertures therein for allowing a relative vertical movement of prop and frame, latch pins slidable vertically in said prop, said frame having apertures therein, and said latch pins adapted to non-releasably enter said apertures when the frame moves vertically on the prop into an independent load sustaining position of the trailer.

2. In a trailer of the class described adapted to be supported on and coupled to a drawing vehicle, a frame, a prop pivotally secured to the forward end of the trailer, said prop and frame having a relative vertical movement on the pivot, said frame having apertures therein, latch pins secured for vertical translation in said prop and engageable with said apertures for non-releasably locking said prop to said frame when the frame is moved vertically on the prop into load sustaining position.

3. In a semi-trailer of the class described, a prop pivoted to the trailer frame and vertically translatable in relation thereto, a detent lock between the frame and the prop to prevent the pivoting of the prop, a lever adapted to withdraw said detent to permit the swinging of the prop, and a shoulder on said detent adapted to prevent its withdrawal from the lock unless partially disengaged by the vertical translation of the prop on the frame.

4. In a trailer of the class described, adapted to have its forward end supported on and coupled to a drawing vehicle, a frame, a prop pivoted to said frame at the forward end thereof, said prop adjustable as to length, locking means mounted on said prop for locking said prop to the frame, said locking means comprising vertically mounted latch pins, and releasing members engaging said latch pins, said frame having apertures therein for receiving the latch pins and said releasing members adapted to disengage said pins from said apertures when the trailer is supported on the drawing vehicle, and said prop vertically movable on its pivot for non-disengageably entering said latch pins into said apertures when the prop is supporting the forward end of the trailer.

5. In a trailer of the class described, a frame provided with wheels at the rear end thereof, a prop pivoted to the forward end of said frame and having elongated pivot apertures therein permitting a relative vertical movement between prop and frame as the prop supports or is supported by the frame, latch pins vertically slidable in said prop for entering apertures in said frame to lock the prop thereto, and a lever for withdrawing said pins from the apertures for permitting swing of the prop only when the prop is supported by the frame.

6. In a trailer of the class described, a prop, a frame, a cross shaft mounted beneath said frame, said shaft engaging vertical slots in said prop for a swinging prop connection thereto permitting a relative vertical movement of prop and frame, latch pins vertically slidably mounted in said prop, said frame having apertures therein for receiving the ends of said pins, a lever for actuating said pins, and shoulders on said pins adapted to engage abutments on said prop for governing the movement of the pins, the release of said pins from the apertures controlled by the relative vertical movement of prop and frame.

7. In a trailer of the class described, adapted to be supported on and coupled to a drawing vehicle, a frame, a prop, a cross shaft rotatably mounted below the forward end of said frame, said prop hung on said shaft for a relative vertical movement of prop and frame, said frame having apertures therein, latch pins secured on said prop for vertical translation and engageable with said apertures for non-releasably locking said prop to said frame when the frame is moved vertically on the prop into load sustaining position, and a flexible connection from the base of the prop to the frame at the rear of the prop and about the cross shaft for raising the prop when the shaft is rotated and the prop is not in load sustaining position.

8. In a semi-trailer, a pivoted prop for supporting the forward end of the trailer when the trailer is detached from the tractor, locking means for the prop rendered non-releasable by the weight of the trailer upon the prop for maintaining said prop locked, said means being rendered releasable by a limited movement of the prop under its own weight when the forward end of the trailer is raised to relieve the prop of the weight of the trailer, adapting the lock to be released to swing the prop to an inactive position when the trailer is attached to the tractor.

In witness whereof, I hereunto subscribe my name.

RUFUS B. JONES.